(12) United States Patent
Bakke et al.

(10) Patent No.: US 9,790,778 B2
(45) Date of Patent: Oct. 17, 2017

(54) SUBSEA PROCESSING

(71) Applicant: STATOIL PETROLEUM AS, Stavanger (NO)

(72) Inventors: William Bakke, Stabekk (NO); Henning Holm, Oslo (NO); Tor Arne Gunnerød, Tananger (NO)

(73) Assignee: STATOIL PETROLEUM AS, Stavanger (NO)

( * ) Notice: Subject to any disclaimer, the term of this patent is extended or adjusted under 35 U.S.C. 154(b) by 296 days.

(21) Appl. No.: 14/419,867

(22) PCT Filed: Aug. 6, 2013

(86) PCT No.: PCT/EP2013/066503
§ 371 (c)(1),
(2) Date: Feb. 5, 2015

(87) PCT Pub. No.: WO2014/023743
PCT Pub. Date: Feb. 13, 2014

(65) Prior Publication Data
US 2015/0204180 A1 Jul. 23, 2015

(30) Foreign Application Priority Data

Aug. 6, 2012 (GB) .................................. 1213953.1

(51) Int. Cl.
*E21B 43/36* (2006.01)
*B01D 19/00* (2006.01)

(52) U.S. Cl.
CPC .......... *E21B 43/36* (2013.01); *B01D 19/0036* (2013.01)

(58) Field of Classification Search
None
See application file for complete search history.

(56) References Cited

U.S. PATENT DOCUMENTS 4,147,454 A * 4/1979 Willums ............... B29C 53/607
156/430
4,714,378 A * 12/1987 Lincoln ................... E02F 5/104
37/322
(Continued)

FOREIGN PATENT DOCUMENTS

CN 201415071 Y 3/2010
DE 103 10 002 B3 9/2004
(Continued)

OTHER PUBLICATIONS

International Search Report issued in PCT/EP2013/066503 dated Aug. 29, 2014.
(Continued)

*Primary Examiner* — Duane Smith
*Assistant Examiner* — Britanny Precht
(74) *Attorney, Agent, or Firm* — Birch, Stewart, Kolasch & Birch, LLP

(57) ABSTRACT

There is described subsea apparatus and a method for processing fluid from a well. In an embodiment, a pipeline may be arranged to carry the multiphase fluid containing liquid and gas from the well. An outlet extending through a wall of the pipeline may let gas out of the pipeline from said region and through the outlet to separate said gas and liquid. A compressor may be connected to the outlet to compress the separated gas. Separated liquid may be conveyed along a sloping portion of the pipe to a low point in the seabed terrain, and may be conveyed to a pump for boosting the flow of liquid. The pump may be located in an excavated hole or glory hole below the seabed.

26 Claims, 1 Drawing Sheet

(56) References Cited

U.S. PATENT DOCUMENTS

| | | | |
|---|---|---|---|
| 5,117,908 A | 6/1992 | Hofmann | |
| 5,505,502 A * | 4/1996 | Smith | E21B 17/085 |
| | | | 285/334 |
| 5,803,161 A | 9/1998 | Wahle et al. | |
| 6,148,921 A * | 11/2000 | Valla | E21B 43/0107 |
| | | | 166/170 |
| 6,502,635 B1 * | 1/2003 | Underdown | B01D 53/22 |
| | | | 166/267 |
| 2004/0231081 A1 * | 11/2004 | Cafaro | F16L 55/46 |
| | | | 15/104.062 |
| 2006/0062635 A1 * | 3/2006 | Mungall | F16L 1/20 |
| | | | 405/158 |
| 2006/0067792 A1 * | 3/2006 | Joshi | F16L 1/20 |
| | | | 405/171 |
| 2007/0029008 A1 * | 2/2007 | Liu | F16L 59/141 |
| | | | 141/387 |
| 2009/0151928 A1 | 6/2009 | Lawson | |
| 2009/0297271 A1 * | 12/2009 | Hummert | E01C 13/083 |
| | | | 405/51 |
| 2012/0230770 A1 * | 9/2012 | Sintini | E21B 17/015 |
| | | | 405/169 |
| 2015/0260026 A1 * | 9/2015 | Whitney | E21B 43/36 |
| | | | 166/357 |

FOREIGN PATENT DOCUMENTS

| | | |
|---|---|---|
| DE | 10 2006 002 242 A1 | 7/2007 |
| WO | WO 2005/026497 A1 | 3/2005 |
| WO | WO 2006/010765 A1 | 2/2006 |
| WO | WO 2006/098637 A1 | 9/2006 |
| WO | WO 2007/071664 A1 | 6/2007 |
| WO | WO 2009/108063 A1 | 9/2009 |

OTHER PUBLICATIONS

Written Opinion of the International Searching Authority issued in PCT/EP2013/066503 dated Aug. 29, 2014.

* cited by examiner

SUBSEA PROCESSING

FIELD OF THE INVENTION

The present invention relates to subsea processing of fluid from a well.

BACKGROUND

In well production, for example in the oil and gas production industry, it can be necessary to compress fluid from a well in order to ensure that sufficient levels of fluid are produced. Where wells are located subsea and remote distances from other facilities, it can be desirable to compress the well stream to help transport well stream fluids onward to a downstream facility, for example at the surface for example offshore or onshore.

For this purpose, it has been proposed to install compressors subsea near the well head to compress the fluid from the well, in particular the gas phase.

The fluid from the well may be multiphase, containing gas and liquid phases. The amount of liquid and gas, and the nature of the flow, may fluctuate.

Prior proposed arrangements may incorporate some processing of the well fluid upstream of such compressors in order to meet compressor operational requirements. Such processing equipment may include coolers and scrubbers which may be used to reduce liquid content of the gas so that the gas meets the required specification. Liquid that is separated from the gas may be conveyed downstream separately of the gas, for example with the assistance of a liquid pump.

In addition, it has been suggested to provide the compressor in a compressor station on the seabed. Such a compressor station may comprise a robust marine frame which houses and supports the compressor and the processing components (pump, scrubber and/or cooler).

The compressor station configuration facilitates access to the compressor and other processing components. The compressor and processing components may each be provided in removable modules in the frame to facilitate replacement and/or repair.

SUMMARY OF THE INVENTION

The inventors have recognised that a challenge with the conventionally proposed compression stations described above is that a significant increase in size and complexity may be required in order to cope with a large fluid output from a well. Relatively large maintenance costs can then be expected in the operational phase, and total availability to the compression station may suffer due to the complexity.

According to a first aspect of the invention there is provided subsea apparatus for processing fluid from a well as set out in the claims appended hereto.

According to a second aspect of the invention there is provided a method of processing fluid from a well subsea as set out in the claims appended hereto.

Each and any of the above aspects may include further features, as set out in the claims appended hereto or in the present description.

It will be appreciated that features mentioned in relation to any of the above aspects, whether in the claims or in the description, may be combined with each other and between the different aspects.

DESCRIPTION OF THE INVENTION

There will now be described, by way of example only, embodiments of the invention with reference to the accompanying drawings, in which.

Figures 1A, 1B, 2:
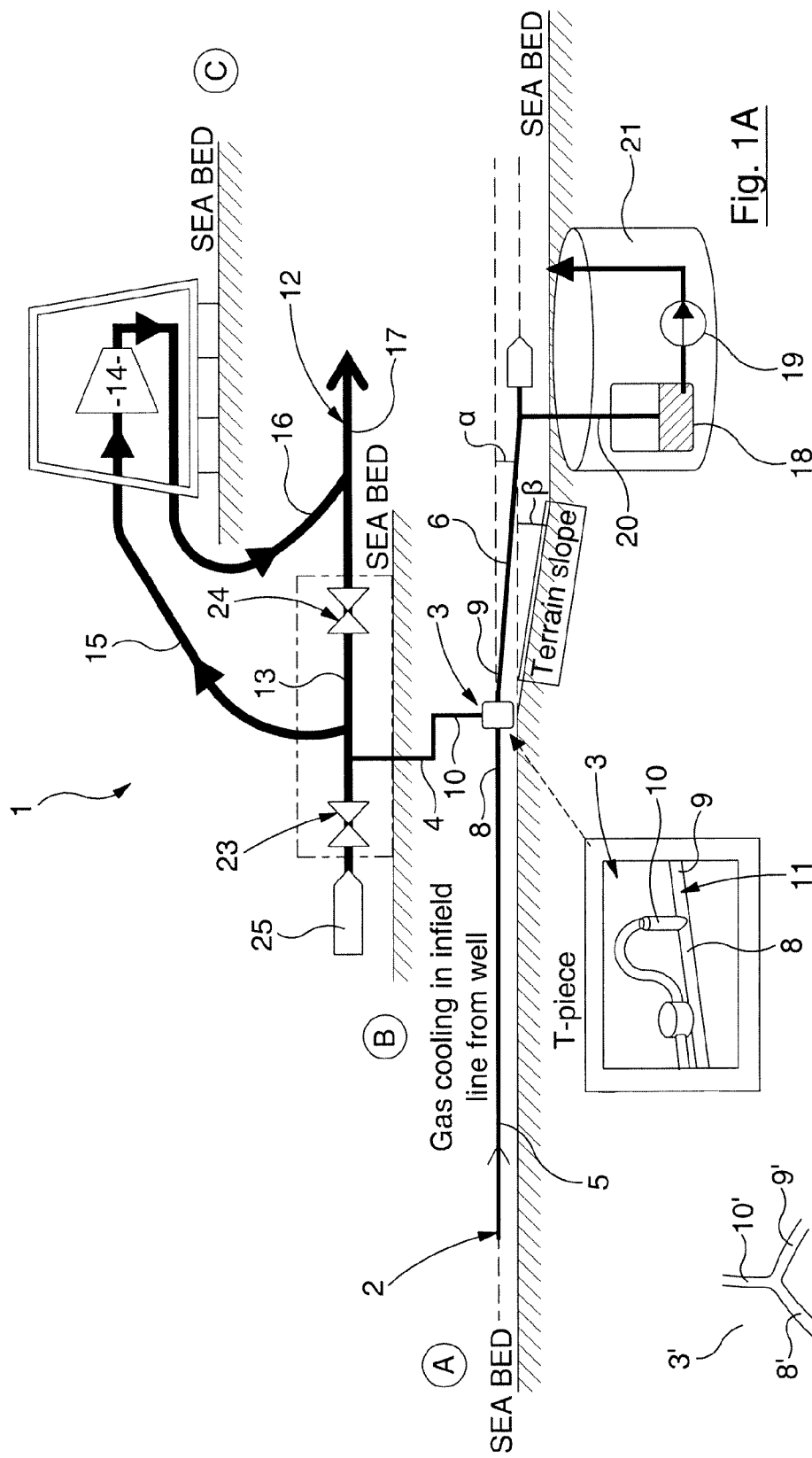
FIG. 1A is a schematic representation of apparatus for processing fluid from a well in accordance with an embodiment of the invention.
FIG. 1B is a representation of a T-shaped pipe tee of FIG. 1A.
FIG. 2 is a representation of a Y-shaped pipe tee for apparatus for processing fluid, in a further embodiment.

In FIG. 1A, the apparatus 1 for processing fluid from a well is exemplified as distributed between different seabed locations A, B and C.

As seen in FIG. 1A, the apparatus 1 includes a pipeline 2 which contains a flow of fluid, e.g. hydrocarbon fluid, from a well. The fluid contains liquid and gas. In proximity to a trunk line 12, a pipe tee is arranged to provide an outlet 3 through the wall of the pipeline 2. The outlet is arranged to let gas out of the pipeline 2 to separate the gas from the liquid and produce separated gas and separate liquid.

The pipe tee 3 can be a three-pronged or three-way tubular tee, for example a T or Y shaped tee. An example of a T-shaped tee is seen in close up in the inset FIG. 1B. The tee has first and second tubular arms 8, 9 and a tubular stem 10. The first and second arms 8, 9 are connected respectively to first and second portions 5, 6 of the pipeline 2. The arms 8, 9 define a fluid flow path extending through the first portion 5, the pipe tee 3, and the second portion 6 of the pipeline 2. FIG. 2 shows an example of a Y-shaped tee 3', comprising tubular first and second arms 8', 9' connected to a tubular stem 10'.

The first and second arms 8, 9 of the pipe tee may together define a tubular body 11 forming a section of the pipeline 2. The outlet may thus be formed through the wall in the tubular body. The stem 10 is connected to and extends radially outwardly from the tubular body 11.

The apparatus has a gas pipe 4 which is connected to the stem 10 and receives gas from the pipeline through the aperture. The stem 10 defines a path for gas between the inside of the pipeline 2 and the gas pipe 4.

As seen in FIG. 1, the tee may in practice be used in an upside-down "T" configuration, with the stem 10 arranged vertically to provide an outlet for gas from a region inside the pipe adjacent to the pipe wall, in an upper part of the pipe wall.

The multiphase fluid may typically be carried inside the pipeline in a stratified flow, in which liquid, e.g. oil, flows along a base of the pipe with gas, e.g. hydrocarbon gas, thereabove. The fluid may typically include hydrocarbon gas and hydrocarbon liquid such as oil.

During operation, a flow of the multiphase fluid passes through the first portion 6, and enters the tee. Gas escapes naturally up through the stem of the tee into the gas pipe 4 (as "separated gas"), whilst liquid from the multiphase fluid remains inside the pipeline, passes the tee and enters into the second portion 6 of the pipeline (as "separated liquid"). In this way, gas is tapped off automatically, as the multiphase flow is passed along the pipeline as a result the gas and liquid contents are separated.

The pipeline 2 may have an internal diameter of up to around 30 inches.

Internal diameters of the first and second arms 8, 9 of the tee may be equal to respective internal diameters of the first and second pipe portions 5, 6 to which the first and second arms are connected. In this way, the pipeline may have a constant internal diameter and define a continuous tube between the first and second portions across the tee. This may minimise disruption to the flow inside the pipeline across the tee between the first and second portions 5, 6.

In certain embodiments, the arms 8, 9 of the tee may have the same internal diameter, or one or the other arm may have a greater or smaller internal diameter than that of the other. In other embodiments, the stem 10 may have the same or a different internal diameter to, for example smaller or grater than, that of either of the arms 8, 9.

It will be appreciated that the arms of the tee may be defined by tubular sections of the first and second portions 5, 6 of the pipeline, whilst the stem 10 may be defined by a section of the gas pipe 4.

The separated gas is passed through the gas pipe 4 to section 13 of a trunk pipeline 12. The trunk line is provided with valves 23, 24, which are shut. The gas is then conveyed from the trunk line section 13 through a gas In-pipe 15 to a compressor 14 which compresses the gas. The compressed gas is conveyed from the compressor 14 through a gas Out-pipe 16 to the trunk line, through which the compressed gas is transported to a downstream facility, e.g. an onshore or topside facility for further processing.

In other embodiments, the gas may by pass the section 13 to enter the compressor 14 directly. However, the arrangement shown is convenient for directing gas to the compressor when switching production from a natural flow production phase to a compression phase in which the compressor is used. In the natural phase, valve 24 is open and gas from the outlet is directed through the valve along the trunk line. In the compression phase, the valves 23, 24 are used to direct gas to the compressor, as shown in the figure. The trunk line has a pig launcher/receiver 25 for launching or receiving pigs through the trunk line through valves 24 and 25 when required.

The trunk pipeline 12 may have an internal diameter of up to around 50 inches.

The separated liquid passes through the second pipeline portion 6 and is conveyed via a tank 18 and pump 19 to a downstream facility (not shown). The liquid may be combined with the compressed gas in the trunk line 12, or may be carried separately of the compressed gas to the downstream facility.

The second portion 6 of the pipeline is sloped to help move the separated liquid under the force of gravity along the pipeline. The length and slope of the second portion 6 is selected so as to be able to absorb liquid slugs in the multiphase flow such that the slug flow effects on the processing system are avoided.

In practice, the portion 6 of the pipeline 2 downstream of the tee may have a length in the range of a few tens of meters to several kilometers and may define a slope inclined at an angle from horizontal of typically 0.5 degrees or greater.

The second portion of the pipeline may extend over a region of the seafloor with a slope in terrain. The natural changes in the seafloor topography may be utilised to provide the necessary slope of the pipeline, downstream of the tee. For example, the pipe may lie on a sloping part of the seabed. The portion 6 may slope from the tee and follow along a slope of the seabed downwards into a topographic low region in the seabed. The tee may be arranged at a relative high point of the seabed. The pipeline may be arranged such that the second portion 6 has a slope greater than the first portion. The first portion 5 of the pipeline may be arranged horizontally. Similarly, the tubular body section of the pipeline defined by the arms 8, 9 of the tee may be arranged horizontally, i.e. with a longitudinal through-axis in a horizontal plane.

The end of the pipeline may be provided with a pipe section 20 connecting the pipeline 2 to the tank 18. The tank 18 is provided in a hole 21, for example an excavation, or glory hole or caisson, extending into the subsurface from the seabed. The pump 19 is connected to the tank and is arranged to receive liquid from the tank on a continuous basis. The pump is also provided in the excavation or glory hole along with the tank. The tank receives and contains separated liquid, and may be dimensioned so as to help absorb variations of liquid content in the multiphase flow. For example, if there is a large variation of liquid content of the fluid from the well, the tank may be sized so that there is little impact on the liquid level within the tank. The tank has an outlet for liquid from the tank. The tank and/or outlet may be arranged to let liquid out of the pump at a consistent rate over time, to the pump. The pump speed may be controllable to control the rate of liquid out of the tank. For example, the pump speed may be controlled or varied based on the level of liquid in the tank. From the pump, the liquid is driven out of the hole along a liquid transport pipe.

By directing the liquid into the hole location below the seabed the influence of the force of gravity to drive liquid flow is enhanced; a difference in potential energy is generated. This facilitates onward transport of liquid, and reduces pump requirements.

In other embodiments, the pump and tank may be located at the seabed for example in a topographic depression. In such a case, the gradient of the slope of the second pipe portion 6 may provide sufficient height above the pump that a significant gravity component contributes to driving the liquid flow.

It can be noted that some gas may be present or be released from the flow of liquid in the tank or in the sloping second portion 6 of the pipeline 2 downstream of the tee. Such gas will travel against the flow of liquid in the vertical pipe 20 and second portion 6, and escape through the outlet of the tee through the wall of the pipeline, into the gas pipe 4. The liquid in the tank provides in effect a dead-end for gas. The only outlet for gas to escape is through the pipe tee 3.

In practice, the hole 21 may be provided with a receptacle or tubular lining to define the necessary space therein for receiving the tank 18 and pump 19. The hole is typically open to the sea. Other processing components may also be provided in the hole 21.

The tee in this case is positioned a substantial distance away from the well, such that the pipeline portion 5 upstream of the tee acts to cool the fluid in the pipeline. The multiphase fluid from the well may at an upstream location close to the well head, have a temperature of around 60-120 degrees Celsius. The temperature of the seawater surrounding the pipeline at the seabed may be around 0 to 4 degrees. As a result, heat is transferred from the fluid across the wall of the pipeline to the surrounding sea causing the fluid inside the pipeline to cool. At the pipe tee, the fluid in the pipeline may have been cooled as a result of its transport through the pipe to a temperature of around 0 to 10 degrees Celsius. By cooling the fluid in the pipe, condensed liquid may be produced from the gas, contributing to reducing liquid content in the gas.

In order to provide sufficient cooling, the pipe tee may be arranged at least 5 km from the well. Thus, the pipeline portion 5 may have a length of at least 5 km.

In other embodiments, a second pipeline, and optionally further pipelines, could be provided in addition to pipeline 2 and arranged similarly. Such a second (or each further pipeline) may be provided with a tee through a wall of the second pipeline to separate gas from the liquid, and separated gas may be supplied to a compressor and be compressed. Multiple compressors may be used. The compressed gas from each such pipeline may be supplied into a single trunk line 12. The trunk line may then act as a common transport pipeline for transporting separated and compressed gas from the different pipelines. Separated liquid from each pipeline may be conveyed to a pump located in a single excavation, caisson or glory hole 21. The hole 21 may then act as a common hole housing equipment for processing liquid from the different pipelines. The liquid from different pipes may be conveyed out of the glory hole in a common liquid transport pipe. A plurality of tanks and/or pumps may be arranged, for example as outlined above in relation to the pipeline 2, to receive and drive the flow of the separated liquid from the pipelines.

Use of a pipe tee provides a simple way of tapping off gas from the pipeline to separate the gas and liquid without any other modification to the pipeline than providing an outlet in the wall of the pipe and connecting the gas pipe thereto. That is, the simple presence of an outlet through the wall in the upper portion of a pipe section removes the gas flowing adjacent to or against the wall inside the pipeline. There is minimal disturbance to the flow, such that the liquid may continue from pipe portion 5 into the pipe portion 6 as a stratified fluid. The flow path for fluid through the pipeline portions 5, 6 and the tee is a smooth, unobstructed and/or slowly changing flow path. The pipeline 2 can simply consist of basic standard pipeline sections and fittings. The walls of the pipeline and/or the tee, i.e. stem and arms, keep the surrounding sea out of the pipeline and/or tee. There is no need for any internal modification to the diameter or any arrangement to stimulate the fluid or liquid inside the pipe in proximity to the outlet aperture or tee.

The apparatus provides good separation efficiency through the outlet in the tee, to a level at which the gas exiting the pipeline at the tee is suitable for compression in a compressor. The fluid and gas is cooled in the upstream portion 5 sufficiently to condensate liquid from the gas such that no further cooling of the gas exiting the pipeline, e.g. in a scrubber, is required before the gas enters the compressor.

Testing indicates that a high 99% by volume separation efficiency can be achieved using the arrangement described. Thus, the separated gas at entry to the compressor may have a liquid content of less than 1% by volume, in particular for gas dominant multiphase fluids from the well.

The invention described has a number of advantages. It provides a simple and effective way of processing multiphase fluid from wells, in particular at a subsea hub where long distance pipelines from satellite wells meet for onward transport in large diameter common trunk lines, in particular where there are large capacity requirements. Subsea compression stations and modules can be reduced in size and made less complex. For example:

1) Routing liquid on a route which does not pass through the compression station for processing by a separate pump, reduces or eliminates the need for liquid handling tanks and pumps on the compression station;
2) The efficiency of separation of the tee is significant, and reduces or eliminates the need for further separation equipment or scrubbers upstream of the compressor; and
3) The use of the pipeline for cooling upstream, reduces or eliminates the need for further cooling equipment upstream of the compressor.

Other advantages may be apparent from reading the description.

It will be appreciated that the term "subsea" should be understood to include usage in land locked or partially land locked seas, such as lakes, fjords or estuarine channels, in addition to open seas and oceans whether containing salt water or fresh water, or mixtures thereof. The term "seabed" has a meaning accordingly.

Various modifications and improvements may be made without departing from the scope of the invention herein described.

The invention claimed is:

1. A subsea apparatus for processing fluid from a well, the apparatus comprising:
   a pipeline arranged to contain a flow of said fluid, said fluid comprising liquid and gas;
   an outlet extending through a wall of said pipeline, said outlet arranged to let gas out of the pipeline through the outlet to separate said gas from said liquid and produce separated gas and separated liquid; and
   a compressor arranged to compress the separated gas,
   wherein a portion of the pipeline downstream of said outlet is arranged to receive said separated liquid, and said portion of the pipeline is sloped over at least part of its length, and
   wherein said pipeline is arranged to be located at or on the seabed, and the sloped portion is arranged to slope in a downstream direction between a first point along the pipeline and a second point along the pipeline, and the seabed is lower at the second point than at the first point.

2. The subsea apparatus as claimed in claim 1, wherein the pipeline has a pipe tee defining said outlet.

3. The subsea apparatus as claimed in claim 2, wherein the pipe tee has a stem and first and second arms connected to and extending from the stem, the arms defining a tubular section of the pipeline and the stem defining said outlet for said gas.

4. The subsea apparatus as claimed in claim 3, wherein the stem is substantially perpendicular to the arms to define a T-shaped pipe tee.

5. The subsea apparatus as claimed in claim 3, wherein the stem is non-perpendicular with respect to at least one of the first and second arms.

6. The subsea apparatus as claimed in claim 5, wherein the pipe tee is generally Y-shaped.

7. The subsea apparatus as claimed in claim 3, wherein the pipe tee is arranged with the stem extending substantially vertically in use.

8. The subsea apparatus as claimed in claim 1, wherein at the second point, a topographic depression is present at the seabed.

9. The subsea apparatus as claimed in claim 1 further comprising a tank arranged to receive said separated liquid, downstream of said outlet.

10. The subsea apparatus as claimed in claim 1 further comprising a pump arranged to receive and pump said separated liquid to move the liquid to a facility located downstream of the pump.

11. The subsea apparatus as claimed in claim 10, further comprising a tank arranged to receive said separated liquid, downstream of said outlet, wherein said tank is arranged upstream of said pump, and the pump is arranged to receive separated liquid from the tank.

12. The subsea apparatus as claimed in claim 9, wherein said pipeline is arranged to be located at or on the seabed, and the sloped portion is arranged to slope in a downstream direction between a first point along the pipeline and a second point along the pipeline, and the seabed is lower at the second point than at the first point, wherein said tank is arranged at or adjacent to said second point.

13. The subsea apparatus as claimed in claim 9, wherein said tank is arranged to be located in a structure formed at the seabed.

14. The subsea apparatus as claimed in claim 13, said structure comprising a hole extending from the seabed into the subsurface.

15. The subsea apparatus as claimed in claim 1, wherein said compressor is supported on the seabed.

16. The subsea apparatus as claimed claim 15, further comprising a marine frame arranged to be located on the seabed to support the compressor.

17. The subsea apparatus as claimed in claim 16, arranged to convey the separated liquid along a route which does not pass through the frame for supporting the compressor.

18. The subsea apparatus as claimed in claim 1, wherein the pipeline is adapted to cool said fluid from the well in a portion of said pipeline upstream of the outlet.

19. The subsea apparatus as claimed in claim 1, wherein no separator is arranged between the compressor and said outlet.

20. The subsea apparatus as claimed in claim 1, wherein no cooler or scrubber is arranged between the pipeline and the compressor.

21. The subsea apparatus as claimed in claim 1, wherein said pipeline has an internal diameter in the range of around 20 to 30 inches.

22. The subsea apparatus as claimed in claim 1, wherein said compressor is arranged to deliver compressed gas into a transport pipeline for transporting the compressed gas to a facility located downstream, said transport pipeline having an internal diameter in the range of around 40 to 50 inches.

23. The subsea apparatus as claimed in claim 1, said fluid comprising hydrocarbon fluid.

24. The subsea apparatus as claimed in claim 1, said outlet being positioned a distance along the pipeline of at least 5 km from the well.

25. A method of processing fluid from a well, the method comprising the steps of:
　　using the subsea apparatus according to claim 1;
　　providing said pipeline;
　　containing a flow of said fluid inside the pipeline;
　　letting gas out of the pipeline through the outlet to separate said gas from said liquid to produce separated gas and separated liquid; and
　　compressing said separated gas using the compressor.

26. The method as claimed in claim 25, wherein the step of compressing said separated gas is performed at the seabed.

* * * * *